(12) United States Patent
Robbins

(10) Patent No.: US 8,462,772 B1
(45) Date of Patent: Jun. 11, 2013

(54) METHOD AND SYSTEM FOR PROVIDING PARTY LINE EMULATION IN A SIP-BASED NETWORK

(75) Inventor: David C Robbins, Grafton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1131 days.

(21) Appl. No.: 11/534,474

(22) Filed: Sep. 22, 2006

Related U.S. Application Data

(60) Provisional application No. 60/719,465, filed on Sep. 22, 2005.

(51) Int. Cl.
*H04L 12/66* (2006.01)

(52) U.S. Cl.
USPC ........... 370/356; 370/260; 370/261; 370/262; 379/202.01; 379/203.01; 379/204.01

(58) Field of Classification Search
USPC ............. 370/296, 352, 260, 348; 379/372.02, 379/177, 179, 181
See application file for complete search history.

(56) References Cited

U.S. PATENT DOCUMENTS

| | | | |
|---|---|---|---|
| 3,737,587 A | 6/1973 | Romero | |
| 4,154,987 A * | 5/1979 | Rosenberg et al. | 379/102.07 |
| 4,528,424 A * | 7/1985 | Middleton et al. | 379/183 |
| 4,723,271 A * | 2/1988 | Grundtisch | 379/181 |
| 4,741,024 A * | 4/1988 | Del Monte et al. | 379/181 |
| 4,950,011 A | 8/1990 | Borcea et al. | |
| 5,165,095 A | 11/1992 | Borcherding | |
| 5,323,444 A | 6/1994 | Ertz et al. | |
| 5,471,519 A | 11/1995 | Howe et al. | |
| 5,619,561 A | 4/1997 | Reese | |
| 5,815,550 A | 9/1998 | Miller | |
| 5,835,570 A | 11/1998 | Wattenbarger | |
| 5,913,166 A | 6/1999 | Buttitta et al. | |
| 5,970,134 A | 10/1999 | Highland et al. | |
| 5,999,610 A | 12/1999 | Lin et al. | |
| 6,021,176 A | 2/2000 | McKendry et al. | |
| 6,026,156 A | 2/2000 | Epler et al. | |
| 6,031,896 A | 2/2000 | Gardell et al. | |
| 6,072,865 A | 6/2000 | Haber et al. | |
| 6,208,726 B1 | 3/2001 | Bansal et al. | |
| 6,219,414 B1 | 4/2001 | Maciejewski et al. | |
| 6,308,726 B2 | 10/2001 | Sato et al. | |
| 6,337,898 B1 | 1/2002 | Gordon | |
| 6,339,639 B1 | 1/2002 | Henderson | |
| 6,404,876 B1 | 6/2002 | Smith et al. | |
| 6,484,196 B1 | 11/2002 | Maurille | |
| 6,510,315 B1 | 1/2003 | Arnson | |
| 6,636,594 B1 | 10/2003 | Oran | |

(Continued)

OTHER PUBLICATIONS

"AINGR: Switching Systems, GR-1298-CORE" Telcordia Technologies, Telcordia Technologies Generic Requirements, GR-1298-CORE, Issue.6, 1226 pages. Nov. 2000.

(Continued)

*Primary Examiner* — Joseph J Nguyen

(57) ABSTRACT

A method and system of an embodiment of the present invention may involve receiving an incoming call from a calling party for one or more members of a group; transmitting an invite message to the one or more members; identifying an acceptance of the invite message by at least one member of the one or more members; and establishing an active dialog between the calling party and the at least one member.

21 Claims, 7 Drawing Sheets

U.S. PATENT DOCUMENTS

| | | | |
|---|---|---|---|
| 6,735,295 | B1 | 5/2004 | Brennan et al. |
| 6,741,695 | B1 | 5/2004 | McConnell et al. |
| 6,744,877 | B1 | 6/2004 | Edwards |
| 6,754,325 | B1 | 6/2004 | Silver et al. |
| 6,801,604 | B2 | 10/2004 | Maes et al. |
| 6,807,259 | B1 | 10/2004 | Patel et al. |
| 6,834,048 | B1 | 12/2004 | Cho et al. |
| 6,856,616 | B1 | 2/2005 | Schuster et al. |
| 6,857,072 | B1 | 2/2005 | Schuster et al. |
| 6,870,830 | B1 | 3/2005 | Schuster et al. |
| 6,876,632 | B1 | 4/2005 | Takeda |
| 6,879,673 | B2 | 4/2005 | Creamer et al. |
| 6,954,521 | B2 | 10/2005 | Bull et al. |
| 6,954,524 | B2 | 10/2005 | Gibson |
| 6,961,332 | B1 | 11/2005 | Li et al. |
| 6,963,633 | B1 | 11/2005 | Diede et al. |
| 6,965,614 | B1 | 11/2005 | Osterhout et al. |
| 6,985,961 | B1 | 1/2006 | Ramsayer et al. |
| 6,996,605 | B2 | 2/2006 | Low et al. |
| 7,020,130 | B2 | 3/2006 | Krause et al. |
| 7,031,700 | B1 | 4/2006 | Weaver et al. |
| 7,039,710 | B2 | 5/2006 | Khartabil |
| 7,050,559 | B2 | 5/2006 | Silver et al. |
| 7,082,193 | B2 | 7/2006 | Barclay et al. |
| 7,085,253 | B2 | 8/2006 | Yang |
| 7,130,282 | B2 * | 10/2006 | Black ............................ 370/296 |
| 7,145,997 | B2 | 12/2006 | Poikselka et al. |
| 7,203,293 | B1 | 4/2007 | Bedingfield |
| 7,224,792 | B2 | 5/2007 | Fusco |
| 7,257,837 | B2 | 8/2007 | Xu et al. |
| 7,260,201 | B2 | 8/2007 | Jorasch et al. |
| 7,274,662 | B1 | 9/2007 | Kalmanek et al. |
| 7,283,517 | B2 | 10/2007 | Yan et al. |
| 7,290,288 | B2 | 10/2007 | Gregg et al. |
| 7,295,577 | B2 | 11/2007 | Moody et al. |
| 7,301,913 | B2 | 11/2007 | Corrao et al. |
| 7,406,696 | B2 | 7/2008 | Burger et al. |
| 7,426,265 | B2 | 9/2008 | Chen et al. |
| 7,440,440 | B1 | 10/2008 | Abichandani et al. |
| 7,460,657 | B1 | 12/2008 | Baeza |
| 7,489,771 | B2 | 2/2009 | McMurry et al. |
| 7,580,497 | B2 | 8/2009 | Wang et al. |
| 7,593,389 | B2 | 9/2009 | Vance |
| 7,599,355 | B2 | 10/2009 | Sunstrum |
| 7,609,700 | B1 | 10/2009 | Ying et al. |
| 7,609,706 | B2 | 10/2009 | Scott et al. |
| 7,630,481 | B2 | 12/2009 | Kafka |
| 7,715,413 | B2 | 5/2010 | Vaziri et al. |
| 7,743,141 | B2 | 6/2010 | Wang et al. |
| 7,773,581 | B2 | 8/2010 | Punj et al. |
| 7,860,089 | B2 | 12/2010 | Tripathi et al. |
| 8,059,805 | B2 | 11/2011 | Claudatos et al. |
| 8,116,302 | B1 | 2/2012 | Robbins |
| 2002/0038388 | A1 * | 3/2002 | Netter ............................ 709/318 |
| 2002/0114318 | A1 | 8/2002 | Rines |
| 2002/0131447 | A1 | 9/2002 | Krishnamurthy et al. |
| 2002/0136359 | A1 | 9/2002 | Stumer et al. |
| 2002/0136363 | A1 | 9/2002 | Stumer et al. |
| 2002/0137495 | A1 | 9/2002 | Gabrysch |
| 2002/0141548 | A1 | 10/2002 | Boda |
| 2002/0156900 | A1 | 10/2002 | Marquette et al. |
| 2003/0028806 | A1 | 2/2003 | Govindarajan et al. |
| 2003/0043992 | A1 | 3/2003 | Wengrovitz |
| 2003/0088421 | A1 | 5/2003 | Maes et al. |
| 2003/0231759 | A1 | 12/2003 | Bedingfield, Sr. et al. |
| 2004/0030750 | A1 | 2/2004 | Moore et al. |
| 2004/0037403 | A1 | 2/2004 | Koch |
| 2004/0051900 | A1 | 3/2004 | Sagiya et al. |
| 2004/0082324 | A1 | 4/2004 | Ayoub |
| 2004/0090954 | A1 | 5/2004 | Zhang et al. |
| 2004/0148395 | A1 | 7/2004 | Schulzrinne |
| 2004/0207724 | A1 | 10/2004 | Crouch et al. |
| 2004/0240656 | A1 | 12/2004 | Poustchi |
| 2004/0243680 | A1 | 12/2004 | Mayer |
| 2004/0249951 | A1 | 12/2004 | Grabelsky et al. |
| 2004/0264406 | A1 | 12/2004 | Pattenden et al. |
| 2005/0013421 | A1 | 1/2005 | Chavez et al. |
| 2005/0043014 | A1 | 2/2005 | Hodge |
| 2005/0069104 | A1 | 3/2005 | Hanson et al. |
| 2005/0078642 | A1 | 4/2005 | Mayer et al. |
| 2005/0123104 | A1 | 6/2005 | Bishop et al. |
| 2005/0129219 | A1 | 6/2005 | Williamson |
| 2005/0147227 | A1 | 7/2005 | Chervirala et al. |
| 2005/0190721 | A1 | 9/2005 | Pershan |
| 2005/0193338 | A1 | 9/2005 | Hawkins et al. |
| 2005/0195802 | A1 | 9/2005 | Klein et al. |
| 2005/0201530 | A1 | 9/2005 | Koch et al. |
| 2005/0213716 | A1 | 9/2005 | Zhu et al. |
| 2005/0215243 | A1 | 9/2005 | Black et al. |
| 2005/0226217 | A1 | 10/2005 | Logemann et al. |
| 2005/0237978 | A1 | 10/2005 | Segal |
| 2005/0249196 | A1 | 11/2005 | Ansari et al. |
| 2005/0286466 | A1 | 12/2005 | Tagg et al. |
| 2006/0033809 | A1 | 2/2006 | Farley |
| 2006/0039389 | A1 | 2/2006 | Burger et al. |
| 2006/0062210 | A1 | 3/2006 | Dharanikota |
| 2006/0062251 | A1 | 3/2006 | Lim et al. |
| 2006/0067300 | A1 | 3/2006 | Poustchi et al. |
| 2006/0067504 | A1 | 3/2006 | Goldman et al. |
| 2006/0140379 | A1 | 6/2006 | Yamamoto et al. |
| 2006/0140380 | A1 | 6/2006 | Croak et al. |
| 2006/0146737 | A1 | 7/2006 | Ohrstrom Sandgren et al. |
| 2006/0165060 | A1 | 7/2006 | Dua |
| 2006/0177030 | A1 | 8/2006 | Rajagopalan et al. |
| 2006/0177044 | A1 * | 8/2006 | O'Neil et al. ............ 379/373.02 |
| 2006/0178130 | A1 | 8/2006 | Makrygiannis |
| 2006/0203986 | A1 | 9/2006 | Gibson |
| 2006/0218283 | A1 | 9/2006 | Jones et al. |
| 2006/0221176 | A1 | 10/2006 | Di Pietro et al. |
| 2006/0251229 | A1 * | 11/2006 | Gorti et al. ............... 379/142.02 |
| 2006/0285533 | A1 | 12/2006 | Divine et al. |
| 2006/0286984 | A1 | 12/2006 | Bonner |
| 2007/0025270 | A1 | 2/2007 | Sylvain |
| 2007/0058613 | A1 | 3/2007 | Beckemeyer |
| 2007/0083658 | A1 | 4/2007 | Hanna et al. |
| 2007/0092073 | A1 | 4/2007 | Olshansky et al. |
| 2007/0111723 | A1 | 5/2007 | Ahmed et al. |
| 2007/0143858 | A1 | 6/2007 | Hearty |
| 2007/0280469 | A1 | 12/2007 | Baker et al. |
| 2008/0049724 | A1 | 2/2008 | Tsujino et al. |
| 2008/0126549 | A1 | 5/2008 | Khanchandani et al. |

OTHER PUBLICATIONS

"Cisco CallManager Features and Services Guide, Release 4.1(3)—Multilevel Precedence and Preemption," Cisco Systems, Inc., http://www.cisco.com/en/US/products/sw/voicesw/ps556/products_administration_guide . . . , Accessed Oct. 24, 2007, pp. 3-5, Copyright 2005.

"IP Office, Do Not Disturb," Carroll Communications, Inc., www.carrollcommunications.com/ipoffice/5donotdisturb.html, Retrieved from the internet on Nov. 6, 2007, 1 page.

"LSSGR Guide, (A Module of LSSGR, FR-64)," Telcordia Technologies, Telcordia Technologies Special Report (3065) Issue 7, Aug. 2003, 114 pages.

"Newton's Telecom Dictionary 22nd Edition," San Francisco, USA, Feb. 2006, p. 829.

"SPCS Capabilities and Features, A Module of LSSGR, FR-64," Telcordia Technologies, Telcordia Technologies Special Report (SR-504), Issue 1, Mar. 1996, 212 pages.

Handley, et al., "SDP: Session Description Protocol, RFC 2327," Network Working Group, The Internet Society, Apr. 1998, 43 pages.

Harrington, et al., "RFC 3411—An Architecture for Describing Simple Network Management Protocol (SNMP) Management Frameworks," The Internet Society, Dec. 2002, pp. 1-65.

Jennings, et al., "Private Extensions to the Session Initiation Protocol (SIP) for Asserted Identity within Trusted Networks, RFC 3325," Network Working Group, The Internet Society, Nov. 2002, pp. 1-18.

Johnston, et al., "Session Initiation Protocol Call Control, Conferencing for User Agents, draft-ietf-sipping-cc-conferencing-04," The Internet Society, Jul. 18, 2004, pp. 1-39.

Lingle, et al., "Management Information Base for Session Initiation Protocol (SIP), draft-ietf-sip-mib-08," Cisco Systems, Inc., The Internet Society, Jul. 16, 2004, 102 pages.

Mahy, et al., "A Call Control and Multi-party usage framework for the Session Initiation Protocol (SIP), draft-ietf-sipping-cc-framework-03," The Internet Society, Oct 27, 2003, pp. 1-43.

Mahy, et al., "The Session Initiation Protocol (SIP) 'Join' Header,' draft-ietf-sip-join-03.txt.," The Internet Society, Feb. 16. 2004, pp. 1-20.

Mahy, "RFC 3842—A Message Summary and Message Waiting Indication Event Package for the Session Initiation Protocol (SIP)," Cisco Systems, Inc., The Internet Society, Aug. 2004, pp. 1-19.

Mahy, et al., "RFC 3891—The Session Initiation Protocol (SIP) 'Replaces' Header," The Internet Society, Sep. 2004, pp. 1-16.

Mahy et al, "RFC 3911—The Session Initiation Protocol (SIP) 'Join' Header," The Internet Society, Oct. 2004, pp. 1-17.

Mahy, at al., "The Session Inititation Protocol (SIP) 'Replaces' Header, draft-ietf-sip-replaces-05.txt., " The Internet Society, Feb. 16, 2004, pp. 1-19.

Petrie, "A Framework for Session Initiation Protocol User Agent Profile Delivery," The Internet Society, draft-ietf-sipping-config-framework-04 Pingtel Corp., The Internet Society, Jul. 19, 2004, 34 pages.

Rosenberg, at al., "A Session Initiation Protocol (SIP) Event Package For Conference State, draft-ietf-sipping-conference-package-04," The Internet Society, May 21, 2004, 29 pages.

Rosenberg, at al., "An INVITE Inititiated Dialog Event Package for the Session Initiation Protocol (SIP)," draft-ietf-sipping-dialog-package-04, The Internet Society, Feb. 13, 2004, pp. 1-35.

Rosenberg, at al. "RFC 3261, SIP: Session Initiation Protocol," The Internet Society, Jun. 2002, 252 pages.

Rosenberg, et al,, "RFC 3262—Reliability of Provisional Responses in the Session Initiation Protocol (SIP)," The Internet Society, Jun. 2002, pp. 1-14.

Rosenberg, et al., "RFC 3840—Indicating User Agent Capabilities in the Session Initiation Protocol (SIP)," The Internet Society, Aug. 2004, pp. 1-35.

Rosenberg, "The Session Initiation Protocol (SIP) Update Method, RFC 3311," Dynamisoft Inc., Network Working Group, The Internet Society, Sep. 2002, pp. 1-13.

Schulzrinne, et al., "Emergency Services URI for the Session Initiation Protocol, draft-ietf-sipping-sos-00," Columbia University, The Internet Society, Feb. 8, 2004, pp. 1-17.

Schulzrinne, et al., "RFC 1889—RTP: A Transport Protocol for Real-Time Applications," The Internet Society, Jan. 1996, pp. 1-75.

Schulzrinne, et al., "RFC 2833—RTP Payload for DTMF Digits, Telephony Tones and Telephony Signals," Columbia University, The Internet Society, May 2000, 30 pages.

Sparks, "RFC 3515—The Session Initiation Protocol (SIP) Refer Method," The Internet Society, Apr. 2003, pp. 1-23.

Sparks, et al., "Session Initiation Protocol Call Control—Transfer, draft-ietf-sipping-cc-transfer-02," The Internet Society, Feb. 15, 2004, pp. 1-37.

* cited by examiner

METHOD AND SYSTEM FOR PROVIDING PARTY LINE EMULATION IN A SIP-BASED NETWORK

CROSS-REFERENCE TO RELATED APPLICATIONS

This patent application claims priority to U.S. Provisional Patent Application No. 60/719,465, filed Sep. 22, 2005, which is hereby incorporated by reference herein in its entirety.

BACKGROUND INFORMATION

Session Initiation Protocol (SIP) is a call control signaling protocol for Internet Protocol (IP) networks. SIP is designed to be device-agnostic—that is, it is intended to provide a highly flexible call signaling capability that is not tailored to the capabilities of any particular device. Analog telephone signaling, on the other hand, is device-specific and highly constrained because of the historical legacy of the services delivered to the device. As a result, many call features available in traditional analog telephone devices are not easily integrated in a SIP-based network.

BRIEF DESCRIPTION OF THE DRAWINGS

In order to facilitate a fuller understanding of the exemplary embodiments of the present inventions, reference is now made to the appended drawings. These drawings should not be construed as limiting, but are intended to be exemplary only.

DETAILED DESCRIPTION OF PREFERRED EMBODIMENTS

A system and process of an exemplary embodiment of the present invention provides a party line emulation service by replicating the behavior of party line calling in a public switched telephone network (PSTN), which allows a single physical line to service multiple physical devices with multiple directory numbers. In one embodiment of the present invention, additional features of party line calling may be replicated, e.g., selective ringing, party detection, and revert calling.

Figure 1:
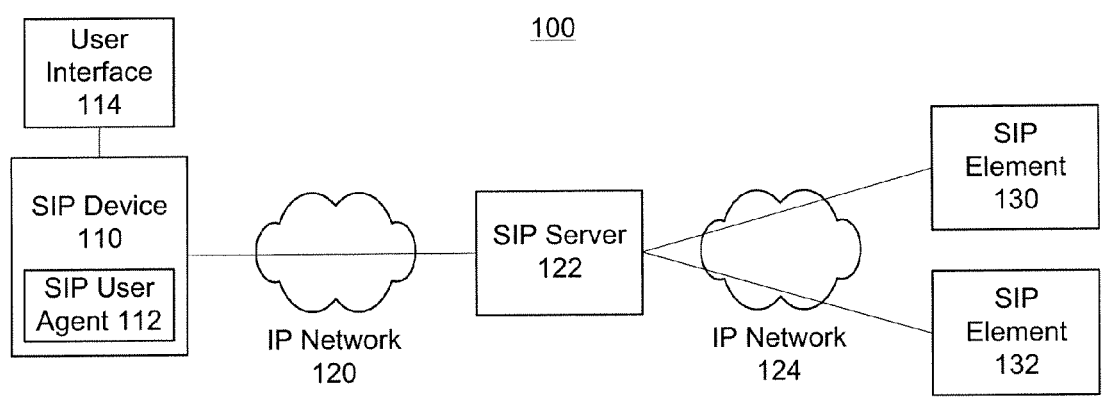
FIG. 1 is an exemplary SIP-based network system, according to an embodiment of the present invention.

FIG. 1 is an exemplary SIP-based network system, according to an embodiment of the present invention. System 100 illustrates an exemplary system for supporting SIP communication, in particular a party line emulation service. As illustrated, SIP Device 110 may be coupled to User Interface 114. SIP Device 110 may include a SIP User Agent 112 for communicating across IP Network 120 to a SIP Server 122. SIP Server 122 may provide communication to other SIP devices, as shown by SIP Element 130 and SIP element 132, through IP Network 124. The various components of system 100 may be further duplicated, combined and/or integrated to support various applications and platforms. Additional elements may also be implemented in the system to support various applications. A SIP-based network may also include an IP network, packet switched based network or other type of network. The elements referred to in the Figures may include other network or packet switched based elements. For example, the elements referred to as "SIP" may include other network devices, elements, components, etc.

SIP Device 110 may represent a device that manages User Interface 114. User Interface 114 may include a traditional telephone and other data communication device using voiceband or other signaling, including but not limited to data modems, facsimile devices, teletype (TTY) equipment, etc. SIP Device 110 may contain SIP User Agent 112. SIP User Agent 112 may be integrated with SIP Device 110 or remote from SIP Device 110. SIP User Agent 112 may perform interworking between SIP signaling and user interface actions. For example, SIP User Agent 112 may manage an exchange of media (e.g., audio, etc.) between User Interface 114 and a Real Time Protocol (RTP) media stream of a media session set up by the SIP signaling. SIP Device 110 may originate calls to and receive calls from other users. SIP Device 110 may communicate through IP Network 120 to SIP Server 122.

SIP Server 122 may represent a SIP proxy or application server that acts on behalf of SIP Device 110. For example, SIP Server 122 may manage a SIP Address of Record (AOR) on behalf of SIP Device 110. SIP Device 110 may register with SIP Server 122 and send SIP signaling through SIP Server 122 to other SIP elements, such as SIP Element 130 and SIP Element 132. For example, a call to the SIP AOR may be delivered to SIP Server 122, which in turn delivers the call to SIP Device 110. SIP Server 122 may perform some service on behalf of SIP Device 110, or may simply forward SIP messages to and from SIP Device 110. SIP Device 110 communicates through IP Network 124 to SIP Element 130 and/or SIP Element 132.

SIP Element 130 and SIP Element 132 may represent users with which the user of SIP Device 110 communicates. SIP Element may be a SIP Device, SIP Server, and/or other SIP enabled device. In addition, SIP Element may also represent a PSTN device that may be reached by a gateway that, directly or indirectly, acts as a SIP User Agent.

In a party line call, SIP Server 122 may manage a set of emulated party lines as a group of bridged lines. Because SIP manages calls and not devices, literal equivalence for party lines may not be achieved. Rather, the SIP User Agents may each have their own address of record (AOR), with the shared party line association between those AORs. The shared association between AORs may be managed by a SIP Server 122, and messages routed and managed by SIP Server 122 may provide an equivalent result. In other words, the SIP Server 122 may serve as an agent for the set of bridged party line devices, such that when one device establishes a dialog, whether inbound or outbound, the other devices in the SIP network are made aware of the identity of that dialog by receiving a dialog event or message via that subscription.

Figure 2:
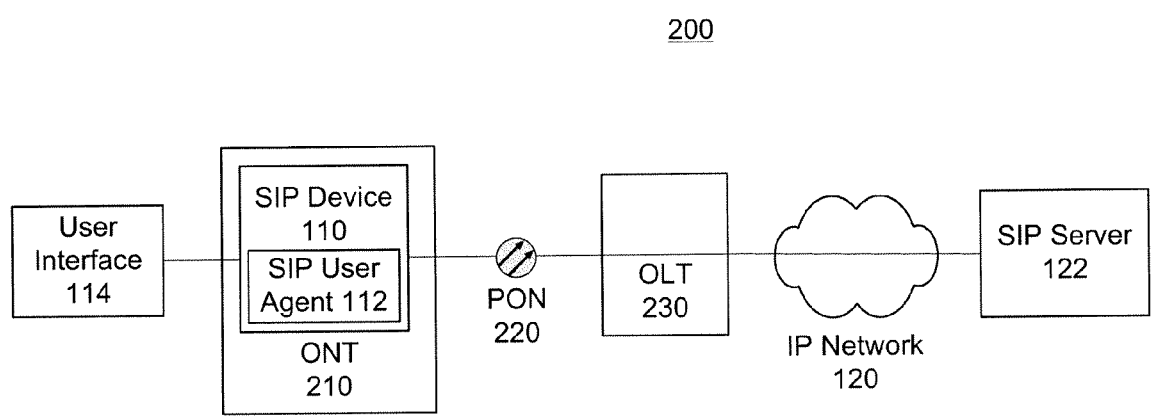
FIG. 2 illustrates an exemplary implementation where a SIP Device is embedded in a FTTP network, according to an embodiment of the present invention.
Figure 3:
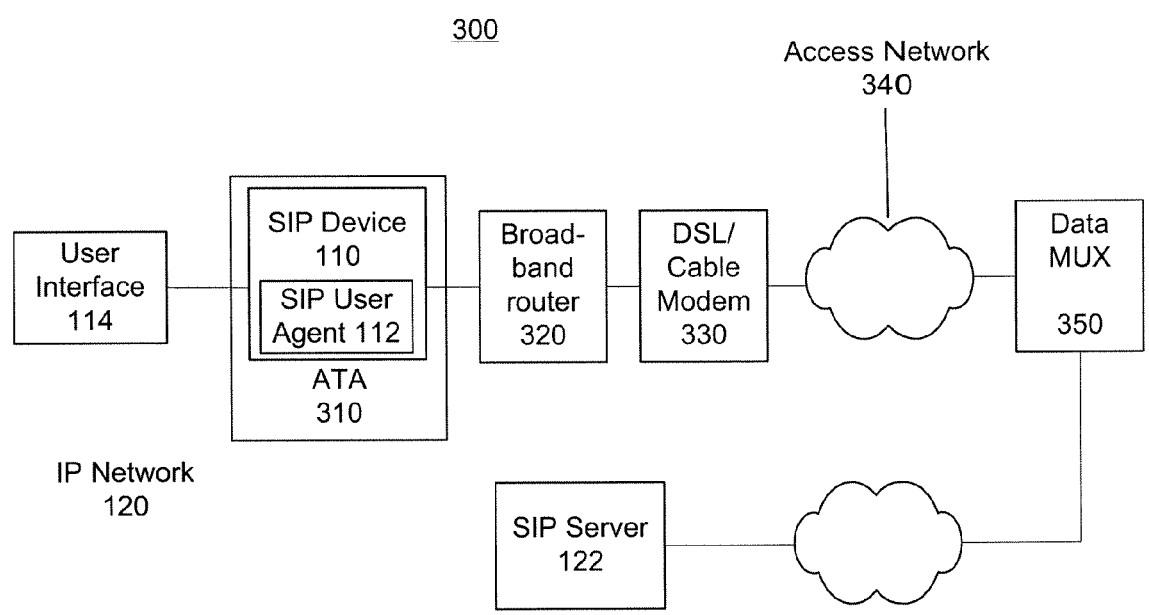
FIG. 3 illustrates an exemplary implementation where a SIP Device is embedded in an ATA device connected to an IP network, according to an embodiment of the present invention.

FIGS. 2 and 3 show exemplary implementations of a SIP Device. FIG. 2 illustrates an exemplary implementation where a SIP Device is used in connection with a Fiber-to-the-Premises (FTTP) network, according to an embodiment of the present invention. FIG. 3 illustrates an exemplary implementation where a SIP Device is embedded in an Analog Telephone Adapter (ATA) which is used in connection with a traditional (e.g., electrical) IP-enabled access network, according to an embodiment of the present invention. Other implementations with other devices and/or networks may also be realized.

As shown in FIG. 2, User Interface 114 may be connected to SIP Device 110. SIP Device 110 may be embedded in Optical Network Terminal (ONT) 210 or otherwise integrated. ONT 210 may be connected to an Optical Line Terminal (OLT) 230 via a Passive Optical Network (PON) 220 acting as an access network for communications between ONTs 210 and OLTs 230. According to an exemplary application, OLT 230 may be located at a Central Office. ONT 210 may be connected over PON 220 to the OLT 230, which in turn passes that connection through transport IP network 120 to SIP Server 122. According to an exemplary application, OLT 230 may maintain an transport IP connection between SIP Device 110 on the ONT 210 and the IP network 120. In this exemplary application, the OLT 230 may not process SIP signaling, but rather allows SIP signaling to pass through to its destination.

FIG. 3 illustrates SIP Device 110 embedded in an Analog Telephone Adapter (ATA) 310 in a home or other location that subscribes to a broadband service delivered via an access network, such as DSL or cable modem service. The ATA device may be attached to a network, such as a broadband data network, IP network and/or other network. User Interface 114 may be connected to SIP Device 110. ATA 310 may be connected to Broadband Router 320, which in turn may be connected to a DSL or cable modem 330, which in turn may be connected to access network 340. Access network 340 may provide connectivity to transport IP network 120 through which the SIP Device 110 may communicate with SIP Server 122. In one example, as shown in FIG. 3, data multiplexer (MUX) 350 may provide a point of connection for transmissions between access network 340 and the transport IP network 120.

The various components of systems 200 and 300 as shown in FIGS. 2 and 3 may be further duplicated, combined and/or integrated to support various applications and platforms. Additional elements may also be implemented in the systems described above to support various applications.

In an Internet Protocol (IP) network using SIP, it may be desirable to replicate the behavior of a party line among two or more SIP User Agents to allow substitution of technology with little or no impact on user behavior. An embodiment of the present invention provides a method and system for using SIP signaling to provide a party line emulation service. Instead of relying upon protocols other than SIP, or on non-standard SIP extensions, an embodiment of the present invention may be based on the SIP server recognizing distinct call information to invoke the behavior similar to analog party line service. In another embodiment, party line emulation may be based on a SIP device to which one or more parties may be connected.

In PSTN, an analog party line service may have two or more subscribers share a single copper pair, with each subscriber having their own directory number. For two-party lines, an electrical party test may be used to identify or detect which party or user goes off-hook. In addition, power ringing (or selective ringing or notification) may also be selectively utilized to avoid ringing every party's telephone as well as provide distinct ring patterns. Another feature is a reverting call service, which may allow one party line subscriber to call another subscriber on the same party line. Because the call is between two telephones on the same copper pair, a reverting call may resemble a home intercom feature.

In addition to two-party lines, support for additional party lines, e.g., four-party lines and eight-party lines may also exist in PSTN. For example, on a four- or eight-party line, party detection may be achieved, however, through an operator where an identity of a calling subscriber may not be known. Furthermore, while two-party lines may enjoy selective alerting (meaning each subscriber may be alerted individually during power ringing), eight-party lines may use a semi-selective alerting feature, in which parties are alerted simultaneously. In addition, four-party lines may use selective or semi-selective alerting. Other variations may also be implemented.

In PSTN, a reverting call may be originated by one of the party line subscribers, who may dial either a directory number of the called subscriber or a special reverting call code identifying the called subscriber, depending on how the party line is provisioned. The caller may then hear a busy tone and hangs up accordingly. The caller and the called subscriber may then be alerted by an alerting pattern that identifies the called subscriber. The called subscriber may then pick up the handset to go off-hook, and the caller may go off-hook after hearing that the alerting has stopped. The two subscribers may then engage in conversation within a party line call.

Party line emulation may be described as an application of a bridged line service. Bridged line service (sometimes referred to as shared call appearance, multiple appearance directory number, and extension bridging), permits two or more user interfaces to act as though they share the same line. No more than one call may be active at any given time on the bridged user interfaces. If one user interface in the group is active with a call, when another user interface in the group goes off-hook, it joins that call rather than initiating a new call, and when the bridged line is called, all user interfaces in the group are alerted, and all can answer. When more than one user interface share the same address of record, the user interfaces will be part of a Bridged Line Group. Party line emulation may have the same characteristics as a Bridged Line Group in which all members share the same address of record, except that instead of all members sharing the same address of record, each member may have its own distinct address of record.

Figure 4:
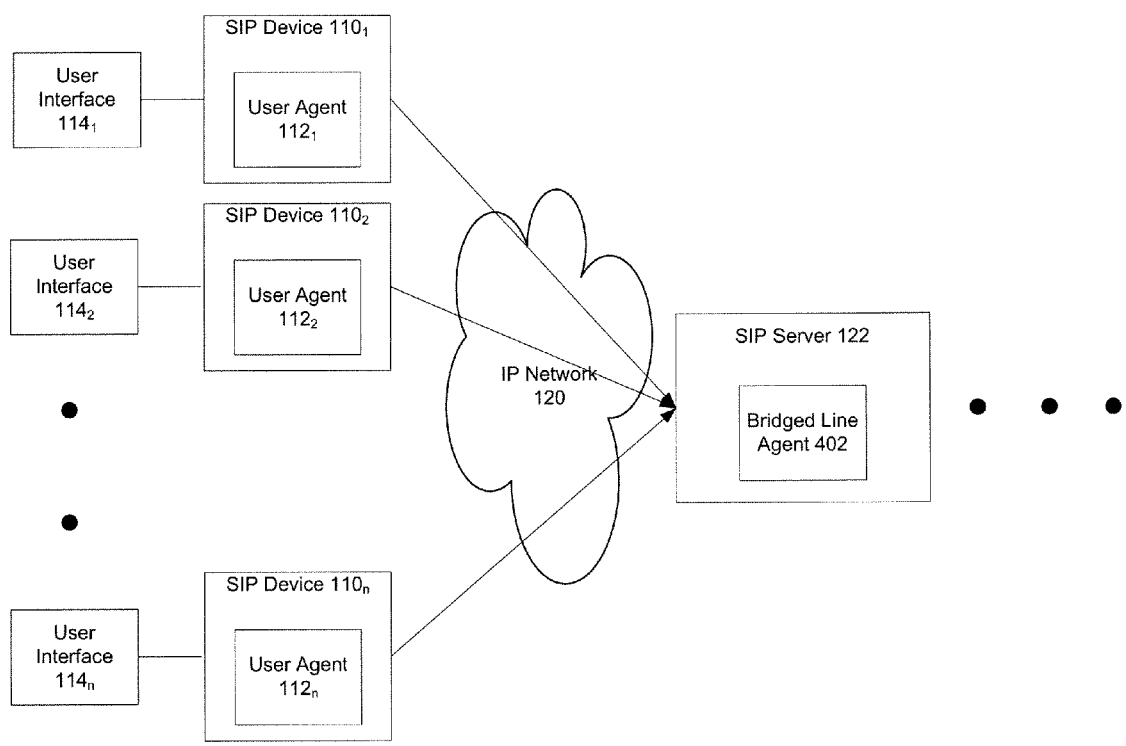
FIG. 4 illustrates an exemplary Bridged Line Group according to an embodiment of the present invention.

FIG. 4 illustrates an example of a Bridged Line Group according to one embodiment of the present invention. In this figure, user interfaces $114_1$, $114_2$, ... $114_n$, their respective SIP devices $110_1$, $110_2$, ... $110_n$ having User Agents $112_1$, $112_2$, ... $112_n$ are part of a Bridged Line Group. The Bridged Line Group communicates across IP Network 120 to SIP Server 122. SIP server 122 includes Bridged Line Agent (BLA) 402. In one embodiment, Bridged Line Agent 402 may be a logical element that supports the Bridged Line Group. Bridged Line Agent 402 may be provisioned into a bridged line unit resource indicator (URI) and a Bridged Line Dialog URI.

In one embodiment, to support a bridged line service, the User Agent may be configured to support provisioning options that specify a Bridged Line Agent URI and a Bridged Line Dialog URI. If a Bridged Line Agent URI is provisioned but a Bridged Line Dialog URI is not provisioned, the Bridged Line Agent URI may be used by the User Agent as the Bridged Line Dialog URI. The two URIs may be considered to be associated with a single User Agent that acts as an "agent" for a bridged line. The implementation, however, may be as two distinct User Agent instances. In another embodiment, party line emulation may define a party line group having, for example, two to eight members (or subscribers), and may define one public address and one reverting call address for each of the members. Thus, party line emulation may not define a single address for the group of lines the way a bridged line service may.

Figure 5:
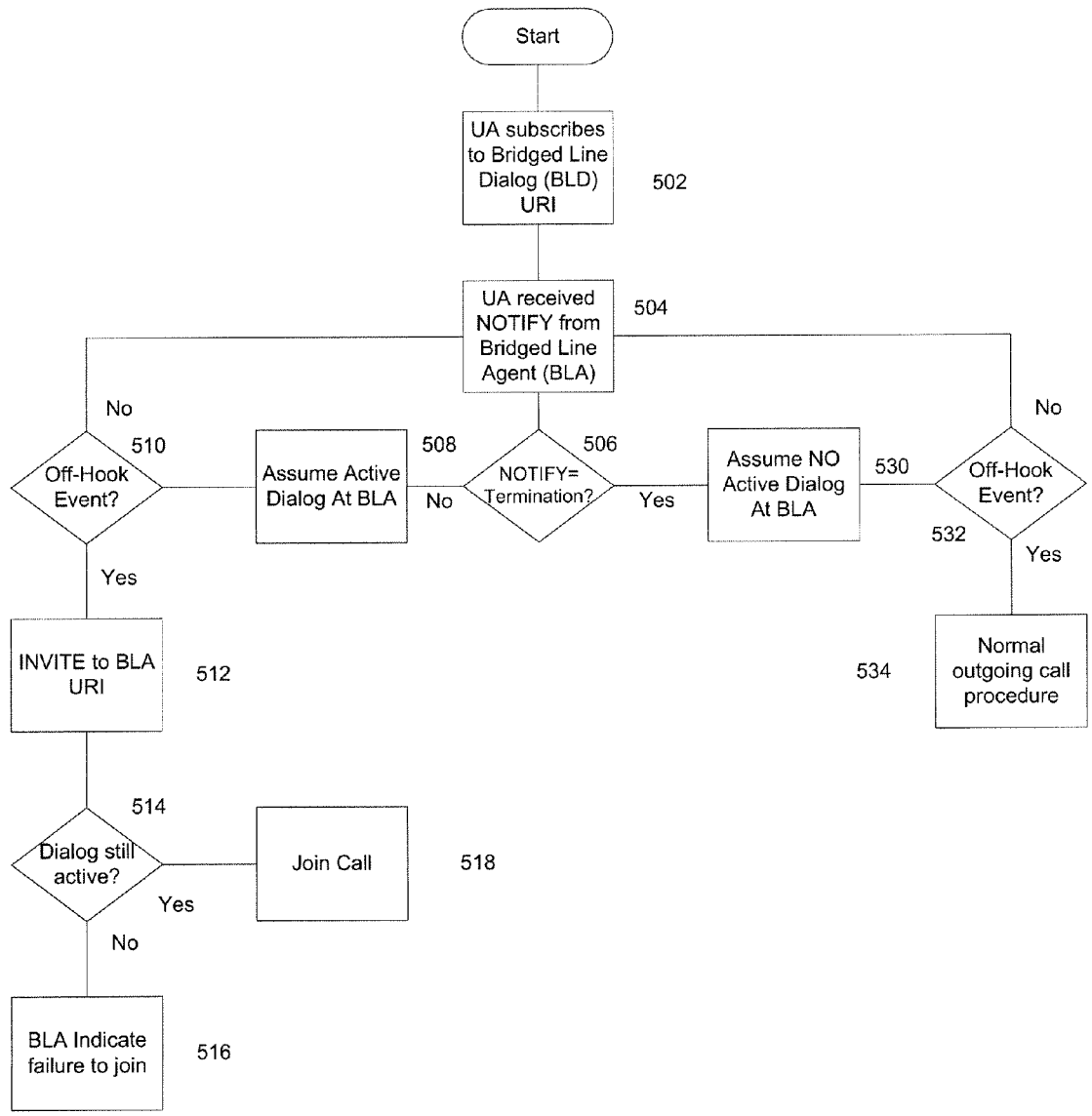
FIG. 5 is a flowchart depicting a method of providing bridged line service according to an embodiment of the present invention.

FIG. 5 depicts a flowchart depicting a method of providing bridged line service, which may be used in providing party line emulation service according to an embodiment of the present invention. In this example, each member may subscribe to dialog events. In step 502, if a Bridged Line Agent URI is provisioned, the User Agent may maintain a subscription to the dialog event notification package, as described in RFC 4235, the content of which is incorporated by reference in its entirety, at the Bridged Line Dialog URI. To do this, in one embodiment, the User Agent may send a SUBSCRIBE request to the Bridged Line Dialog URI. The SUBSCRIBE request may contain an event header that specifies the "dialog" event package. The User Agent may request that the subscription be for all dialogs, by specifying no event parameters in the SUBSCRIBE request.

In an embodiment of the present invention, the User Agent may send the SUBSCRIBE request when it first registers with the SIP server. The subscription may be maintained indefinitely. To maintain the subscription, the User Agent may periodically send the same SUBSCRIBE request. The frequency of the refresh may be determined by the Bridged Line Agent.

In one embodiment, each member may also receive a dialog state notification. For example, once the User Agent is subscribed to the Bridged Line Dialog, in step 504, the User Agent may receive a NOTIFY from the Bridged Line Agent informing the User Agent when a dialog is created at the SIP server and when a dialog is ended. In one embodiment, the Bridged Line Agent may send a NOTIFY to the User Agent when a dialog comes into existence at the Bridged Line Agent, and may also send a NOTIFY when a dialog is terminated at the Bridged Line Agent. A dialog in existence at the Bridged Line Agent may represent an existing dialog, such as a call to the party line group, or a call from a member of the party line group.

In one embodiment, the NOTIFY for the subscription may not include a body. In this case, the User Agent may not infer anything about the current state of a dialog at the Bridged Line Agent. Such a NOTIFY may be sent as the immediate response to the SUBSCRIBE request.

In another embodiment, if the NOTIFY does contain a body, the Content-Type may be "application/dialog-info+xml" and the content of the body may include at least a <dialog-info> element that contains a <dialog> element that contains a <state> element. These elements are more fully described in RFC 4235. The Bridged Line Agent may provide at least the values "confirmed" and "terminated" for the state element, and may also provide other state values. The NOTIFY body may further include a call identifier, local tag, and remote tag to identify the dialog.

Prior to receiving any notification of the Bridged Line Agent dialog state, the User Agent may assume that no dialog is active at the Bridged Line Agent. If, in step 506, the NOTIFY received from the Bridged Line Agent specifies a dialog state other than "terminated," in step 508, the User Agent may assume that a dialog is active at the Bridged Line Agent. If the dialog has a dialog state of "terminated," in step 530, the User Agent may assume that no dialog is active at the Bridged Line Agent.

In one embodiment, a member may join an active dialog. For example, in step 510, if there is an off-hook event, the User Agent may respond by sending an INVITE to the Bridged Line Agent URI, as depicted in step 512. In one embodiment, if the NOTIFY body from the Bridged Line Agent included a call identifier, local tag, and remote tag, the INVITE request may include a Join header, as discussed in RFC 3911, the content of which is incorporated by reference in its entirety, to specify that the new dialog join the specified active dialog. Otherwise, the Bridged Line Agent may assume that an INVITE directed to the Bridged Line Agent from a member of the party line group is intended to join the existing dialog.

In another embodiment, each member may also originate a call when no dialog is active. For example, in step 514, if the Bridged Line Agent receives an INVITE request intended to join an existing dialog when the existing dialog is no longer active (e.g., if the dialog had ended between step 504 and step 514), or under circumstances where the member is not permitted to join the dialog (e.g., if a member of the bridged line group already in the dialog has activated a "privacy" control that forbids additional members from joining the call), in step 516, the Bridged Line Agent may take an action indicating the failure of the connection, such as, for example, returning a failure response to the INVITE request or connecting the call attempt to a tone or announcement provided by the Bridged Line Agent.

In step 518, the member may be joined with the existing dialog. In one embodiment, audio mixing is performed by the SIP server. In step 530, in response to a NOTIFY having a dialog state of "terminated," the User Agent assumes that there is no active dialog. If, in step 532, there is an off-hook event, in step 536, the User Agent performs standard outgoing call procedures. As a result, the Bridged Line Agent may manage the set of emulated party lines as a group of bridged lines so that any member going off-hook may bridge onto the existing active dialog.

Figure 6:
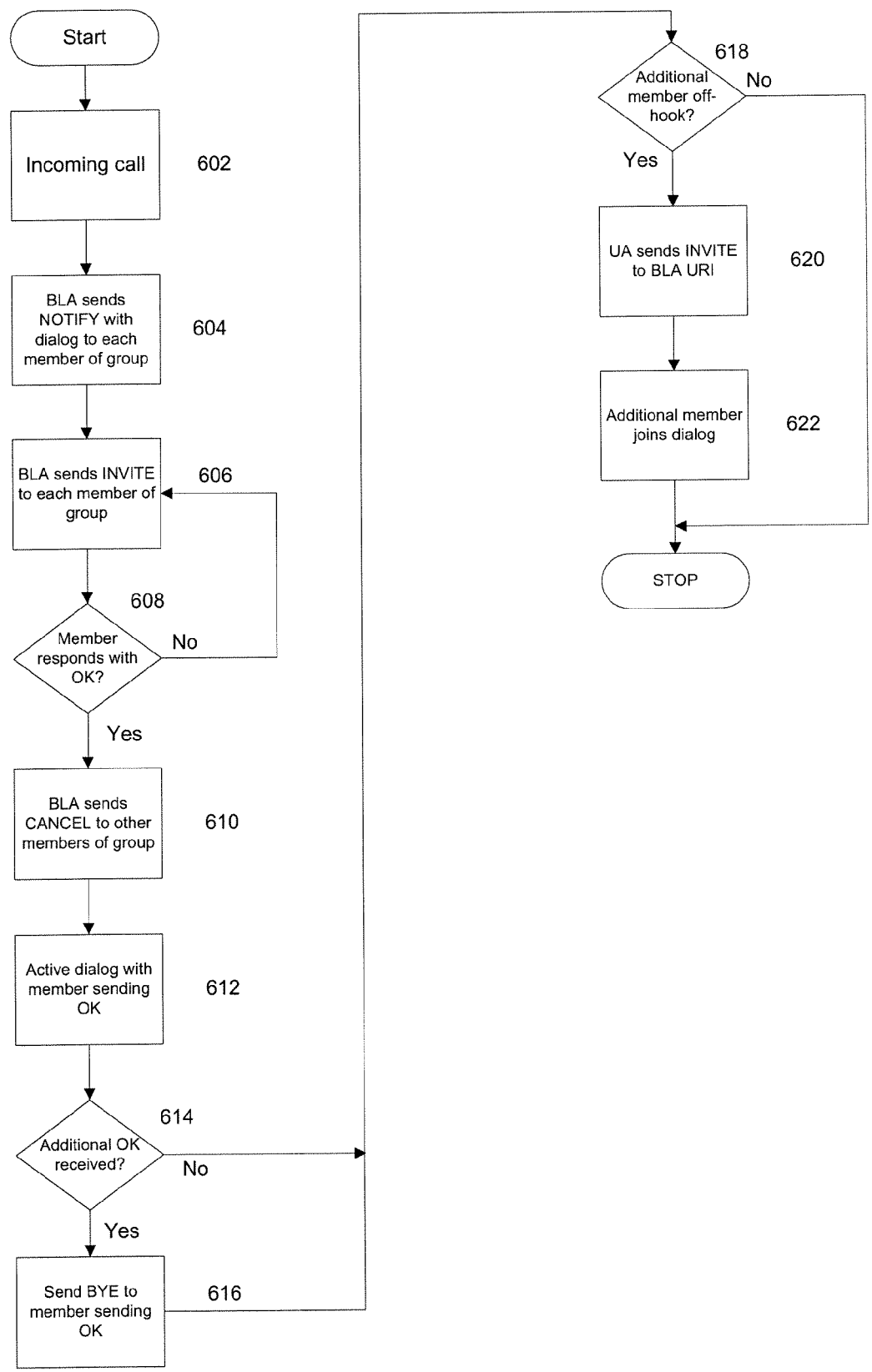
FIG. 6 is a flowchart depicting a method of receiving an incoming call for a Bridged Line Group according to an embodiment of the present invention.

FIG. 6 depicts a flowchart representing a method of processing an incoming call to a party line group according to one embodiment of the invention. In one embodiment of the present invention, there may be an incoming call for a member of a party line group that has been configured as a Bridged Line Group, as depicted in step 602. In this example, the incoming call is not to the group, but to the public address of a member of the group. In step 604, the Bridged Line Agent creates a dialog and sends the corresponding NOTIFY to each member of the group.

In step 606, the Bridged Line Agent may send an INVITE request to each member of the Bridged Line Group. In contrast to bridged line processing, in one embodiment, the INVITE may include an Alert-info header field to specify the notification pattern that corresponds to the respective selective or semi-selective notification to be used for party line notification. A member, through a respective SIP User Agent 112 may identify the INVITE message at the SIP Device 110 to alert the member with the ring pattern specified by header field in the INVITE message. The ring pattern for each of the party address may be based on call data, characterized as predefined rules, such as a calling party number, a called party, a priority of a call, an origin of a call relative to a specific caller group or local area, or any combination thereof. Additional call data variations may also be considered. As discussed above in the PSTN, two-party lines use selective alerting, eight-party lines use semi-selective alerting, and four-party lines may use either form of alerting. In one embodiment of the present invention, such alerting may be replicated for party line emulation in a SIP network. Other variations and embodiments may also be considered. As a result, the INVITE may be effectively sent to select members of the group according to the (fully) selective or semi-selective notification, e.g., ringing or other notification, that corresponds to the member to which the call is directed, as expected by party line users.

In step 608, when one member of the group responds to the INVITE request with a OK, in step 610, the Bridged Line Agent may send a CANCEL request to the remaining members of the group to cancel the INVITE, and in step 612, an active dialog with the member sending the OK is established.

It is possible for a call to the party line group to be answered by two or more User Agents. This is depicted as step 614. If this happens, in one embodiment of the invention, in step 616, the Bridged Line Agent may respond to the second and subsequent OK responses by sending a BYE.

In step 618, if the member remains off-hook, or if additional member(s) go off-hook, the Bridged Line Dialog state continues to be active. Thus, in step 620, the User Agent may send an INVITE to the Bridged Line Agent URI to join the Bridged Line Dialog. In step 622, the member may then join the dialog.

In order to provide party line behavior, the Bridged Line Agent should be aware of all call origination attempts from the group members. If a call to the party line group arrives at the Bridged Line Agent when a dialog (either originated by a group member or a call to the group) is active, the call may receive a 486 (Busy Here) response. When a call from a group member to a reverting call address for a group member is identified, the Bridged Line Agent may handle it according an embodiment of the present invention. For example, the Bridged Line Agent may play a busy signal to the member that called the reverting call address. Once the Bridged Line Agent receives a BYE from the member, the Bridged Line Agent may send an INVITE to a set of members determined by the originating member and the member identified by the reverting call URI. In one embodiment, these two members may be alerted. In another embodiment, additional members may be alerted (e.g., by semi-selective ringing or other notification). When a 200 OK from a member is received in response to the INVITE, a shared dialog may be created at the Bridged Line Agent and the answering member may join. The Bridged Line Agent may then send a CANCEL to all remaining members to which the INVITE was sent. All the members may then be notified of the status of the shared dialog at the Bridged Line Agent. As a result, additional members may join the shared dialog (e.g., at least one additional member may be required to join in order to establish a conversation).

Figure 7:
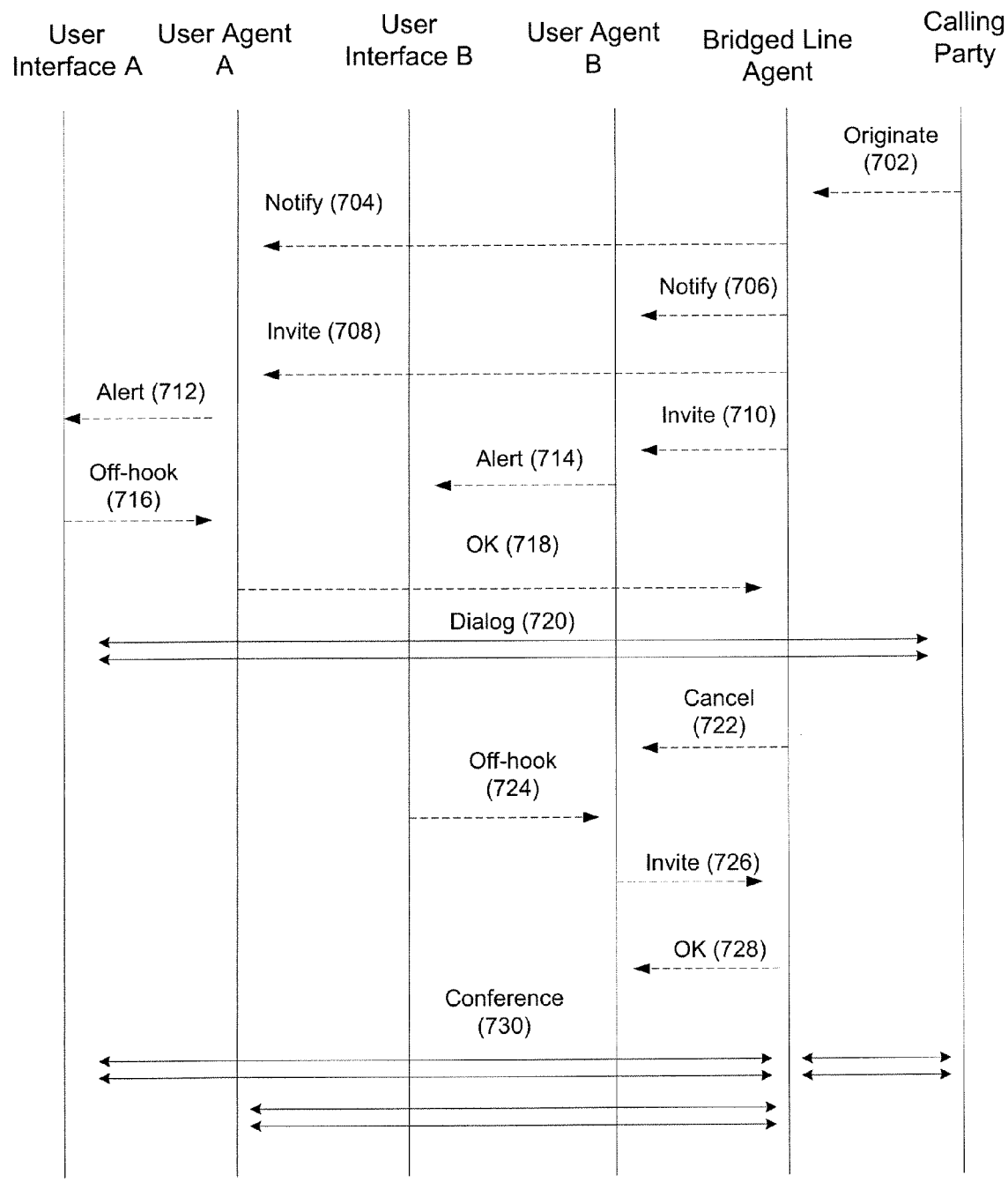
FIG. 7 is an example call flow according to an embodiment of the present invention.

FIG. 7 depicts an example call flow for a call to a party line group according to one embodiment of the invention. In this example, there may be two members of the party line, User Interface A and User Interface B, which may be part of a Bridged Line Group. When a call originates (702) from a calling party, the SIP server may send a NOTIFY to both User Agent A (704) and User Agent B (706), followed by respective INVITEs (706 and 710).

User Agent A may alert User Interface A (708) and User Agent B may alert User Interface B (712). In this example, User Interface A may go off-hook, and User Agent A may send an OK to the SIP server (718). A dialog between User Interface A and the calling party may then be established (720). SIP server may then send a cancel to User Interface B (722).

User Interface B may then go off-hook (724), and User Agent B may send an INVITE to SIP server (726). SIP server may respond with an OK (728), and a conference may be established between User Interface A, User Interface B and the calling party (730), with audio mixing performed by the SIP server.

In yet another embodiment of the present invention, a SIP device-based emulated party line service may be provided. This exemplary application may be particularly useful in rural areas, for example, where a lot of reusable copper wire may exist. Instead of replacing all the existing wire, a SIP device-based party line emulation service may be captured within a single SIP device 110 that may provide service to two or more parties on a single analog port that the SIP device may manage. In this example, a SIP device 110 may control a single pair of copper wires so that the wires may continue to appear like a party line to a subscriber.

Each party may have one or more analog devices, e.g., telephone sets or other devices, all being connected to the analog port of the SIP device. Each analog telephone set may be configured to respond to a particular (fully) selective or semi-selective ringing voltage or a combination of voltages. For a two-party service, the analog telephone set may also be able to identify to which party it belongs when it goes off-hook. This may allow the SIP device to determine which party is attempting to originate the call. Other variations and implementations may also be considered.

In one embodiment, each party may have a unique SIP address known by the SIP device. Thus, a call to that party may be received by the SIP device as an INVITE to the party's unique SIP address. In another embodiment, each party may have a unique reverting call address known by the SW device. In this example, the reverting call address may or may nor be the address to which calls to a party are directed. Other various embodiments may also be provided.

In another embodiment, the SIP device may associate with each party regarding two specifications of the selective or semi-selective ringing voltages and/or cadences to be applied to the analog line to alert that party. For example, one may be directed to calls to a party's SIP address. In another embodiment, one may be directed to calls a party's reverting call address.

When the SIP device receives an INVITE request directed to a party's SIP address, it may apply to the analog port the ringing voltages and/or cadences associated with that party. This may result in that party's telephone sets ringing (or being notified). In one embodiment, it may also result in the telephone sets of other parties to ring or be notified as well, depending upon the particular voltage and/or cadence configurations. As a result, while ringing is applied to the analog port, any telephone set or device may go off-hook and therefore answer the call.

In one embodiment, when at least one telephone set is off-hook, whether or not it is actively engaged in a call, the off-hook condition may be sensed by the SIP device at the analog port. Therefore, if the SW device receives an INVITE request, it may return a 486 (Busy Here) response to that request.

In another embodiment, when a telephone set attached to the analog port goes off-hook to originate a call, the SIP device may provide a dial tone and collect the dialed digits in a usual manner. Unless the collected digits match at least one of the reverting call addresses associated with one of the parties, the SIP device may send an INVITE request containing the collected digits to the network to originate a normal call. If the service is a two-party service with telephone sets that uniquely identify the party to which they belong, the SIP device may include in the INVITE request the originating party identification associated with the party that originated the call. Otherwise, in one embodiment, the SIP device may include in the INVITE request an originating party identification that does not identify any party as the originating party. This may be done to reflect the fact that the identity of the originating party is not known. In another embodiment, if the call requires identification of the originating party, the call may be routed to an operator who will ask for the identity of the caller.

In an embodiment of the present invention, if the collected digits match one of the reverting call addresses associated with one of the parties, the SIP device may not send an INVITE request. Instead, it may wait for an on-hook condition to be sensed on the analog port, apply to the analog port the ringing voltages and cadences associated with the party with which the reverting call address is known (which may result in both the calling and called parties hearing ringing), cease ringing and apply talking voltage to the analog port when an off-hook condition is sensed (the called party may answer first, and when the calling party hears that ringing has stopped, the calling party will go off-hook to engage in conversation), and after ringing has been applied for a certain interval with no answer, ringing may cease and the port will revert to an idle state. During this entire procedure, an incoming INVITE will receive a 486 response.

In another embodiment of the present invention, an SIP server 122 may recognize a reverting call. A reverting call may enable communication between two or more parties on a single line similar to a home intercom service. In an SIP network, this may work within IP network 120. In this example, the SIP server 122 may identify when a reverting call originator goes on-hook. The SIP server 122 may then alert the originator and/or the one or more SIP devices specified by the originator. Alerting the SIP devices may take place in non-reverting calls. Once the originator and the SIP devices are alerted, the SIP server 122 may establish a reverting call service by bridging the calls when one or more SIP devices goes off-hook.

In yet another embodiment of the present invention, the SIP Server 122 and the SIP Device 110 may be provisioned to disable any or all services that not traditionally provided in a party line service. Ultimately, if a user's experience of a party line service is desired, the service may be completely replicated in SIP.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method, comprising:
receiving an incoming call from a calling party for a plurality of members of a group at an SIP server;
transmitting, from the SIP server, an invite message to the plurality of members, wherein the invite message comprises one or more addresses that specifies each of the members of the group;
identifying an acceptance of the invite message by at least one accepting member of the plurality of members;
transmitting, from the SIP server, a cancel message to at least one member of the plurality of members, wherein the cancel message is sent after the identified acceptance;
establishing a SIP-based active dialog between the calling party and the at least one member;
recognizing a reverting call;
identifying when a reverting call originator goes on-hook;
alerting one or more members of the group;
identifying when the one or more devices goes off-hook; and
providing a reverting call emulation service when establishing the SIP-based active dialog.

2. The method of claim 1, wherein the incoming call is received from a packet switched network.

3. The method of claim 1, wherein the one or more address comprise a member-specific address for each of the members of the group.

4. The method of claim 1, wherein the invite message comprises a header that specifies an alerting pattern.

5. The method of claim 4, wherein the alerting pattern comprises selective alerting.

6. The method of claim 5, wherein selective alerting comprises alerting a device associated with each of the plurality of members individually.

7. The method of claim 4, wherein the alerting pattern comprises semi-selective alerting.

8. The method of claim 4, wherein the alerting pattern comprises alerting a device associate with each of the plurality of members simultaneously.

9. The method of claim 4, wherein the alerting pattern comprises alerting device associate with each of the plurality of members with a different ring pattern.

10. The method of claim 4, wherein the alerting pattern comprises a distinctive ringing pattern based on at least one of the following: a calling party number, a called party number, a priority of a call, and an origin of a call relative to a specific caller group or local area.

11. The method of claim 1, wherein establishing the active dialog further comprises determining when a member is off-hook or on-hook.

12. A non-transitory computer readable medium comprising computer executable instructions which when executed causes a computer to perform:
receiving an incoming call from a calling party for a plurality of members of a group at an SIP server;
transmitting, from the SIP server, an invite message to the plurality of members, wherein the invite message comprises one or more addresses that specifies each of the members of the croup;
identifying an acceptance of the invite message by at least one accepting member of the plurality of members;
transmitting, from the SIP server, a cancel message to at least one member of the plurality of members, wherein the cancel message is sent after the identified acceptance;
establishing a SIP-based active dialog between the calling party and the at least one member;
recognizing a reverting call;
identifying when a reverting call originator goes on-hook;
alerting one or more members of the group;
identifying when the one or more devices goes off-hook; and
providing a reverting call emulation service when establishing the SIP-based active dialog.

13. A method, comprising:
identifying, at an SIP device, an incoming call, wherein the incoming call comprises an invite message specifying one or more party addresses;
identifying one or more party addresses from the incoming call;
providing an alerting pattern to a plurality of devices attached to an analog port corresponding to the one or more party addresses;

establishing a SIP-based active call between the caller and a party at the device when at least one of the plurality of devices goes off-hook;

transmitting a cancel message to at least one of the plurality of devices that does not go off-hook;

recognizing a reverting call;

identifying when a reverting call originator goes on-hook; and providing a reverting call emulation service when one or more devices connected to the analog port goes off-hook.

14. The method of claim 13, wherein the one or more party addresses are member-specific.

15. The method of claim 13, wherein the analog port comprises connections to two or more devices.

16. The method of claim 13, wherein the device is a telephone set.

17. The method of claim 13, wherein the alerting pattern is based on an alerting voltage applied to the analog port.

18. The method of claim 13, wherein providing the alerting pattern comprises alerting each of the one or more devices individually.

19. The method of claim 13, wherein providing the alerting pattern comprises alerting each of the one or more devices simultaneously.

20. The method of claim 13, wherein providing the alerting pattern comprises alerting each of the one or more devices with a different ring pattern.

21. A non-transitory computer readable medium comprising computer executable instructions which when executed causes a computer to perform:

identifying, at an SIP device, an incoming call, wherein the incoming call comprises an invite message specifying one or more party addresses;

identifying one or more party addresses from the incoming call;

providing an alerting pattern to a plurality of devices attached to an analog port corresponding to the one or more party addresses;

establishing a SIP-based active call between the caller and a party at the device when at least one of the plurality of devices goes off-hook;

transmitting a cancel message to at least one of the plurality of devices that does not go off-hook;

recognizing a reverting call;

identifying when a reverting call originator goes on-hook; and providing a reverting call emulation service when one or more devices connected to the analog port goes off-hook.

* * * * *